United States Patent [19]
Dorenbosch

[11] Patent Number: 6,085,102
[45] Date of Patent: Jul. 4, 2000

[54] METHOD AND APPARATUS FOR PROVIDING COVERAGE IN A SELECTIVE MESSAGING SYSTEM

[75] Inventor: Jheroen Pieter Dorenbosch, Paradise, Tex.

[73] Assignee: Motorola, Inc., Schaumburg, Ill.

[21] Appl. No.: 08/927,155

[22] Filed: Aug. 29, 1997

[51] Int. Cl.[7] .............................. H04B 7/005; H04B 7/01
[52] U.S. Cl. ........................ 455/503; 455/59; 455/447
[58] Field of Search ................................ 455/502, 503, 455/525, 500, 447, 67.3, 60, 62, 59, 63; 340/825.44

[56] References Cited

U.S. PATENT DOCUMENTS

| | | | |
|---|---|---|---|
| 4,525,861 | 7/1985 | Freeburg | 455/422 |
| 4,849,750 | 7/1989 | Andros et al. | 340/94 |
| 4,881,073 | 11/1989 | Andros et al. | 340/825 |
| 4,897,835 | 1/1990 | Gaskill et al. | 370/94.1 |
| 4,935,732 | 6/1990 | Andros et al. | 340/925.44 |
| 5,287,550 | 2/1994 | Fennell et al. | 455/503 |
| 5,295,180 | 3/1994 | Vendetti et al. | 455/456 |
| 5,485,633 | 1/1996 | Burke et al. | 455/503 |
| 5,530,918 | 6/1996 | Jasinski | 455/525 |
| 5,706,331 | 1/1998 | Wang et al. | 455/426 |
| 5,812,950 | 9/1998 | Tom | 455/440 |
| 5,852,780 | 12/1998 | Wang et al. | 455/450 |
| 5,878,352 | 3/1999 | Souissi et al. | 455/503 |
| 5,915,210 | 6/1999 | Cameron et al. | 455/59 |

Primary Examiner—Reinhard J. Eisenzopf
Assistant Examiner—Charles N. Appiah
Attorney, Agent, or Firm—Charles W. Bethards

[57] ABSTRACT

A selective messaging system controller (105) and analogous methods arranged to schedule messages and control transmitters in a messaging system (100) having a service area so as to enhance a reuse factor, includes: a network port (102) for accepting message requests that is coupled to a processor (131) for forming a first plurality of messages, including an associated zone ID (407) for each message, scheduled for concurrent transmission, during a first time period, within a first coverage pattern (503) that creates interference areas (525) and a second plurality of messages scheduled for concurrent transmission, during a second time period, within a second coverage pattern (505) that provides coverage for a portion of the interference areas; the processor further coupled to a transmitter port (106), for sending the pluralities of messages to the transmitters and controlling these transmitters; and a receiver port (109) for receiving a registration message including one coverage zone ID that identifies a coverage zone (511) for a selective messaging unit (135).

13 Claims, 4 Drawing Sheets

METHOD AND APPARATUS FOR PROVIDING COVERAGE IN A SELECTIVE MESSAGING SYSTEM

RELATED APPLICATIONS

Application Ser. No. 08/649,559, attorney Docket No. PF01165NA, filed on May 17, 1996 by Goldberg, et al., entitled "Method And Apparatus In A Radio Communication System for Assigning and Utilizing Sets of Transmitters."

FIELD OF THE INVENTION

The present invention concerns messaging systems and more particularly methods and apparatus, in a selective messaging system, for scheduling messages and providing coverage so as to enhance or improve reuse capability in such systems.

BACKGROUND OF THE INVENTION

Selective messaging systems, such as paging or data systems, are known. Many of these systems are simulcast systems where a message is simultaneously or nearly simultaneously launched from each or all transmitters in a system. Practitioners have found these systems provide excellent coverage in that a messaging unit, such as a pager, is very likely to receive any message intended for the unit, regardless of the location of the unit or lack of knowledge on the part of the system of the location of the unit. However such systems have poor if any reuse capability as all transmitters are transmitting or attempting to deliver the same message at the same time.

Other systems are arranged to practice targeted message delivery. In these instances only a transmitter(s) likely to reach the messaging unit is(are) used to transmit or deliver a message to the unit. Reuse is improved as transmitters that are not being used for the message delivery, excepting those that will or may interfere with the delivery, may be concurrently used to deliver or transmit other messages. However this improved reuse requires very current knowledge of messaging unit location so the proper transmitter(s) may be used. Less accurate knowledge of the units location will result in dramatically lower reuse due to poor transmitter selection and multiple message repeats in systems, such as two-way paging where units are expected to acknowledge messages. Accurate location knowledge for mobile users often comes at a price. For example, inbound channel capacity devoted to receiving location information from the selective messaging units can be strained, the processing power devoted to analyzing and updating this information may be become prohibitive, and the battery capacity of the messaging units devoted to updating location information may be undesirable. Additionally poorer coverage may result in the absence of simulcast operation.

Clearly a need exists for apparatus and methods of providing coverage in a selective messaging system that provides improved or enhanced reuse capability without unduly sacrificing other operational attributes.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

The present disclosure concerns selective communications systems such as messaging systems as further exemplified by paging systems. More specifically methods and apparati are discussed that define and operate with a plurality of overlapping coverage patterns comprised of interfering coverage zones. The coverage zones may be delivering or transmitting messages concurrently and the overlapping coverage patterns insure at least one zone provides coverage anywhere within a service area for the messaging system. Using the principles disclosed here, reuse factors of approximately 6 are expected with excellent coverage whereas reuse factors in a conventional simulcast paging system are nil while coverage is excellent. In a full targeted delivery system reuse factors may reach 10 to 20 but coverage can be limited.

A selective messaging system controller, in a messaging system having a service area, that is arranged to schedule messages and control transmitters so as to enhance a reuse factor is defined. The selective messaging controller includes a network port for accepting message requests from message originators and a processor, coupled to the network port for forming a first and a second plurality of messages. The processor is arranged for scheduling the first plurality of messages for concurrent transmission within a plurality of first coverage zones that collectively create one or more interference areas during a first time period where each message is scheduled for, preferably simulcast, transmission within a unique first coverage zone; and then scheduling the second plurality of messages for concurrent transmission within a plurality of second coverage zones during a second time period, each message being scheduled for, preferably simulcast, transmission within a unique second coverage zone, the plurality of the second coverage zones providing coverage for a portion of the interference areas generated by the first coverage zones. Further included is a transmitter port, coupled to the processor, for sending the first and the second plurality of messages to the transmitters and controlling the transmitters to effect the concurrent transmission of the first and the second plurality of messages.

The messages are each associated with a zone ID and preferably additionally include an associated priority. The use of the priority(s) in a coverage pattern defined by coverage zones is analogous to the use of priorities as reviewed and taught in a co-pending application by Dorenbosch titled METHOD AND APPARATUS FOR COORDINATING AN OPERATING CHANNEL SELECTION. This co-pending application, identified as attorney docket number PF01402NA, having a like filing date and assigned to the same assignee as here, is hereby incorporated herein by reference. Further the selective messaging system controller will, preferably include a receiver port for receiving a registration message including one coverage zone ID that identifies a coverage zone for a selective messaging unit. The selective messaging system controller or specifically the processor defines each unique first coverage zone by assigning a first set of the transmitters and each unique second coverage zone by assigning a second set of the transmitters where the second set includes one or more transmitters from one of the first set of the transmitters. Additional pluralities of messages for additional pluralities of coverage zones are scheduled where the additional pluralities of the coverage zones collectively provide coverage throughout the service area. Preferably simulcast transmission is used within each coverage zone and the concurrent transmission within adjacent coverage zones serves to improve or enhance reuse factors for the system.

An analogous method set in a selective messaging system arranged to have transmitters within a service area will be discussed with reference to FIG. 7. This method of scheduling messages includes scheduling a first plurality of messages for concurrent transmission within a plurality of first coverage zones during a first time period, each message scheduled for transmission within a unique first coverage zone, the plurality of the first coverage zones creating an interference area; and then scheduling a second plurality of messages for concurrent transmission within a plurality of second coverage zones during a second time period, each message scheduled for transmission within a unique second coverage zone, the plurality of the second coverage zones providing coverage for a portion of the interference area.

A further method, set in a selective messaging system, of providing coverage with an improved reuse factor, the method includes assigning a plurality of transmitters to provide independent simulcast coverage within a first set of coverage zones during a first time period, the first set of coverage zones defining a first coverage pattern, a portion of the first set of coverage zones creating interference areas; and reassigning a portion of the plurality of transmitters to provide independent simulcast coverage within a second set of coverage zones during a second time period, the second set of coverage zones defining a second coverage pattern and providing coverage for a portion of the interference areas during the second time period. The plurality of transmitters are reassigned to provide independent simulcast coverage within additional sets of coverage zones defining additional coverage patterns until all interference areas are provided with coverage.

Figure 5:
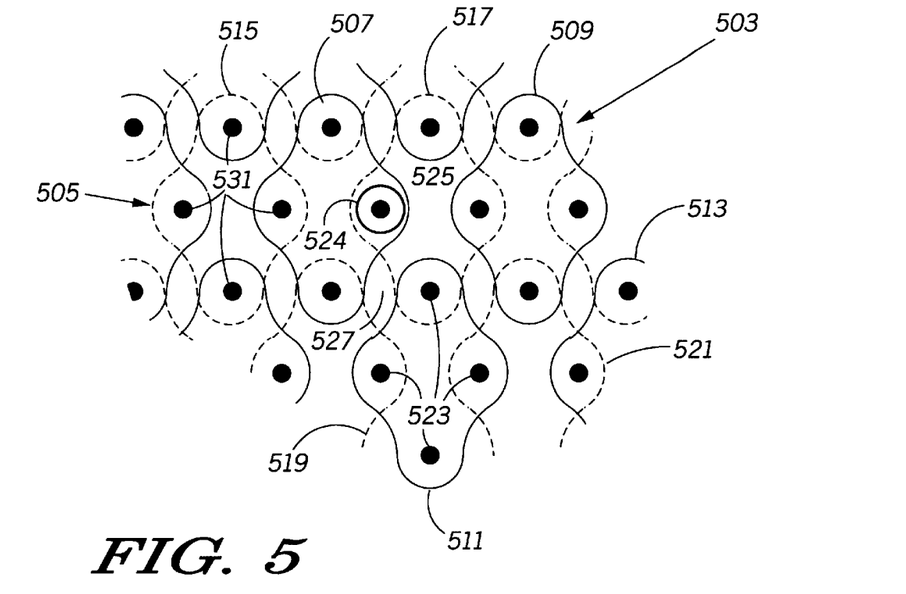
FIG. 5 and FIG. 6 are illustrative coverage maps depicting coverage zone patterns in accordance with the instant invention.
Figure 6:
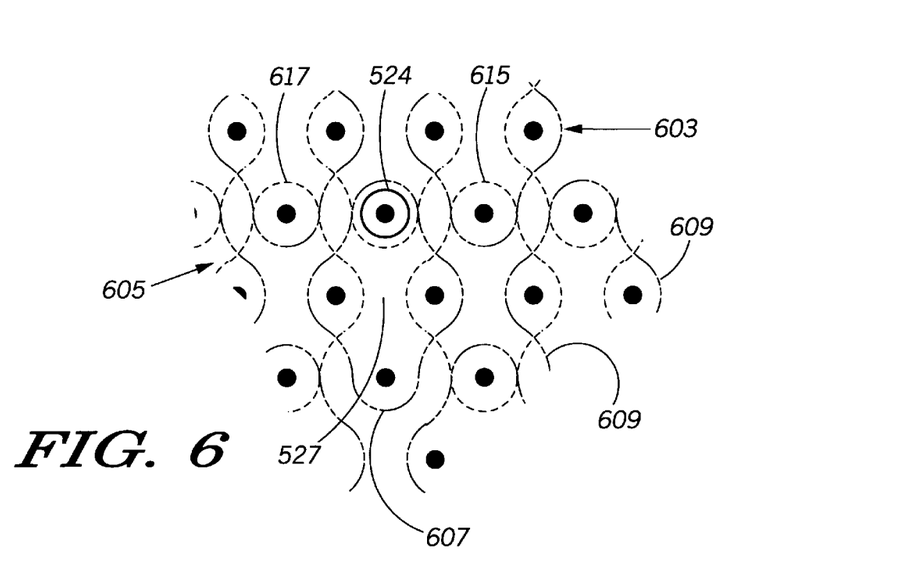

Continuing the present disclosure the reader is referred to the FIG. 5 and FIG. 6 illustrative coverage maps. FIG. 5 depicts a first coverage pattern (503) collectively comprised of a multitude of geographic areas or coverage zones each outlined or depicted by a solid line, such as coverage zones (507, 509, 511, 513). Additionally a second coverage pattern (505) is shown as collectively comprised of a multitude of coverage zones each outlined or depicted by a dashed line, such as coverage zones (515, 517, 519, 521). The area within the solid or dashed lines represents a geographic area or coverage zone within which a selective messaging unit may reliably obtain coverage or service from the system during times when the relevant coverage pattern is used. The dots each represent the location of a transmitter and the dots within a coverage zone (511) a set of transmitters (523) that provide service or transmit messages to that zone while the relevant coverage pattern is used. One dot or transmitter (524) has been emphasized to serve as a reference point between FIG. 5 and FIG. 6.

The areas between the coverage areas for a coverage pattern, such as interference area (525) are interference areas resulting from the fact that all coverage zones within a coverage pattern are concurrently and independently operating with the transmitters within a coverage zone, preferably, operating in a simulcast mode to provide service to messaging units within that coverage zone. By observation much of the interference area (525) will have reliable service from coverage zone (517) when the second coverage pattern (505) is active. However coverage is not provided for interference area (527) by any coverage zone in coverage patterns (503, 505).

Referring to FIG. 6 a depiction is provided of a third coverage pattern (603) collectively comprised of a multitude of geographic areas or coverage zones each outlined or depicted by a broken line, such as coverage zones (607, 609). Additionally a second coverage pattern (605) is shown as collectively comprised of a multitude of coverage zones each outlined or depicted by a dashed line, such as coverage zones (615, 617). By observation the interference area (527) and like areas are provided coverage by, respectively, coverage zone (607) or sister coverage zones when the third coverage pattern is utilized.

Generally the creation of coverage patterns must continue until all of the service area is provided coverage by at least one coverage zone. It is noted that practical systems will not resemble the illustrative maps in terms of regularity of coverage zone sizes or transmitter set size due to the vagaries of radio coverage and geography. In actual systems appropriate coverage patterns and coverage zones within those patterns will likely be determined by experimentation and reliance on field strength maps.

Generally a messaging system using the inventive principles discussed here operates as follows. All transmitters are operating continually. Each messaging unit monitors the channel(s) it is programmed to monitor. When or during the time the messaging unit accurately receives a channel or more specifically a control or block information word (BIW) it will decode a zone ID that uniquely identifies a zone within which it is located. A messaging unit may successfully receive multiple zone Ids. If so it can select the first zone ID or in one embodiment select the zone ID with the highest or best associated priority, or select the zone ID that has an associated best reliability as assessed by signal strength or bit error rate or the like. In any event the messaging unit then registers with the selective messaging system on the reverse or inbound channel during one of the available ALOHA slots with its address and the selected zone ID. Thereafter messages for this messaging unit are queued and scheduled for the corresponding zone when the corresponding coverage pattern is used until a new registration message is received.

Figure 1:
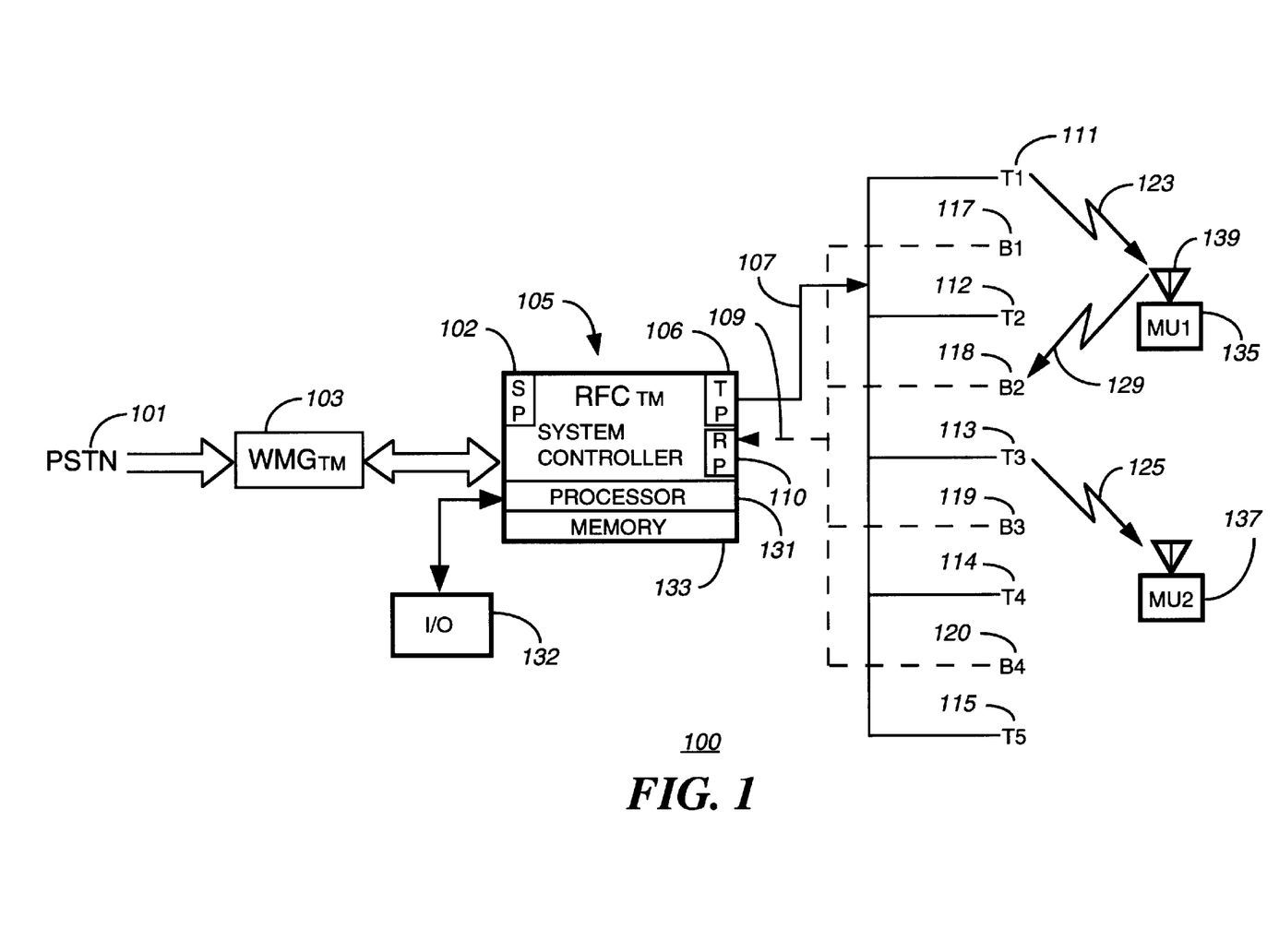
FIG. 1 is a block diagram of a selective messaging system suitable for employing an embodiment of the instant invention.

Continuing the present disclosure the reader is referred to the FIG. 1 depiction of a representative paging or messaging system (100), preferably, a selective two-way messaging system, communicating with a plurality, two depicted, of messaging units (135, 137). The messaging system (100) includes a gateway or terminal (103), coupled to a message source from which message requests are obtained such as the public switched telephone network (101). The terminal (103) is available from Motorola as the WMG™ product as well as from other manufacturers. The terminal is coupled to, often collocated with, a selective messaging system controller or system controller or controller (105), such as a Motorola RF CONDUCTOR™ suitably modified with the inventive principles discussed herein. The terminal (103) and system controller (105), coupled together by a switch or network port (102) operate together to communicate messages such as control or block messages or messages with destination addresses for various messaging units (135, 137)

from the terminal (103) to the system controller (105) or various responses, in the case of a two-way system, back to the terminal (103), thus to the PSTN (101) and the originator.

The messaging system (100) includes, coupled to the controller (105), via a transmitter port (106), by the outbound network channel (107), a plurality of transmitters with five depicted as a first through 5th transmitter (111 . . . 115). The transmitters are available, for example, as Motorola NUCLEUS II™ transmitters or from other suppliers. The outbound network channel (107) is preferably leased telephone lines but may be any suitable media operating with any suitable networking or communication protocol including a radio or satellite link. The system or subsystem, specifically controller and transmitters are arranged and constructed and operate to provide coverage and service in one or more geographic areas, service areas, or coverage zones such as the areas that were discussed with reference to FIG. 5 and FIG. 6. It is understood that the FIG. 2 system is exemplary only and that much other equipment not here shown nor here relevant may be required in a practical system.

Additionally, the messaging system (100), in its preferred two-way form, includes, coupled to the system controller (105), via a receiver port (110), by a network channel (109), a plurality of base receivers, such as four depicted base receivers (117–120). The network channel is preferably leased telephone lines or any other suitable network link with the bandwidth necessary for the traffic expected on the channel. Typically at least some of the base receivers will be deployed at geographic locations different from the transmitters and typically more receivers are deployed than transmitters.

Generally the messaging system is a scheduled system using a protocol such as the FLEX™ family, preferably, REFLEX™ two-way protocols by Motorola where all messages outbound or inbound are transmitted within time slots in a time frame on an outbound or inbound channel (123, 129) each normally a different radio frequency. Typically within a given system or specifically coverage zone or subsystem within the system all transmitters operate on the same outbound frequency or channel and often and preferably in a simulcast (nearly identical launchtime) mode. The system controller provides control of the system including scheduling outbound or inbound messages for messaging units that are registered on or subscribe to the system's services. The system controller (105) is responsible for maintaining the schedule, designating what coverage zones and coverage patterns and respective transmitter(s) and when within the overall schedule for each coverage zone and coverage pattern, a message for a messaging unit will be transmitted, notifying messaging units of the time slot where they will receive messages and, if two way units, during what inbound time slot they are expected to acknowledge receipt of the message and what inbound slots are available for volitionally originated messages, according to a slotted ALOHA contention algorithm.

The outbound messages are forwarded to the transmitters for subsequent transmission to one or more messaging units, such as the depicted messaging units (MU) (135, 137) in accordance with the system protocol at a particular time on the forward or outbound radio channels (123, 125). Messages originating at the messaging unit (135), either volitionally as in a registration request or responsive to a received message, such as an acknowledgment, are coupled by the reverse or inbound radio channel (129) to one or more of the base receivers where they are forwarded or relayed to the system controller on the inbound or network channel (109). The system controller may use these inbound messages for scheduling decisions, such as repeats, may forward them to the terminal, if, for example, they are intended for a user destination, or may use them as operational parameters to perform various traffic analysis and system management or configuration functions, such as updating the coverage zone for a selective messaging unit.

Referring to the more detailed diagram of the system controller (105), the operation and basic structure of the controller will be explained. As above noted the controller or messaging system controller is adapted for scheduling messages on a channel or an operating channel or specifically on one or more coverage zones. The messaging system controller includes a processor (131) that is, preferably based on a 32 bit SuperSPARC microprocessor designed and distributed primarily by Sun Microelectronics.

The processor (131) is coupled to the various input output ports, specifically network, transmitter, and receiver ports (102, 106, 110), a user I/O device (132), such as a terminal, and further coupled to a memory (133). The memory is a combination of disk, ROM, and RAM based storage suitable for storing all operating software as well as database information required by the system controller (105). In the exemplary diagram of FIG. 1 the controller is shown as a single entity. However it is understood that the controller and the terminal (103), either or both, may be composed of distributed terminal or distributed controller functions or resources and may be either collocated or located at a plurality of physical locations. This situation would likely be encountered in a large paging system such as the system depicted in FIG. 5 and FIG. 6 and may depend on system loading or complexity and countless other variables.

Figure 3:
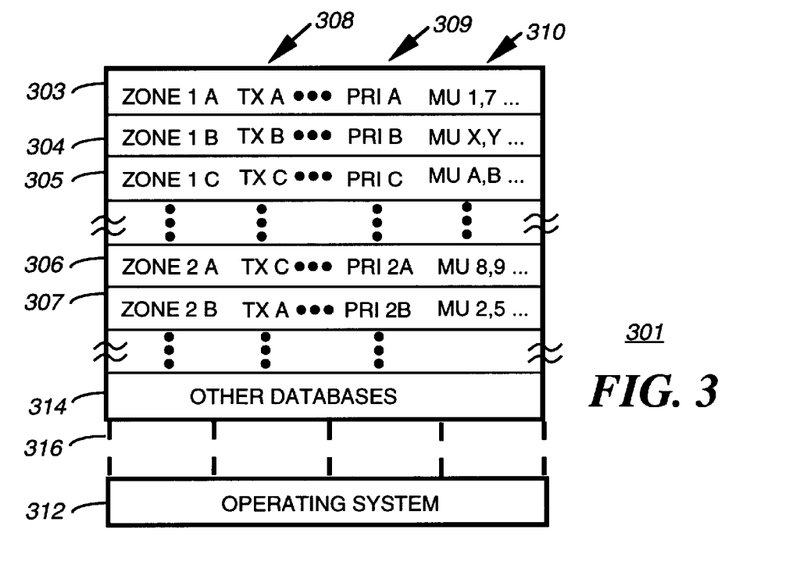
FIG. 3 is a illustrative map of contents of a memory suitable for use in an embodiment in accordance with the instant invention.

The memory (133) of the system controller (105) is also used to retain information on a list of the channels or coverage zones employed in controlling the plurality of transmitters that are managed by the system controller (105). The reader is referred to the FIG. 3 depiction of an illustrative map of contents of memory (301). The list of potential operating zones for a selective messaging unit may be a subset of the list of coverage zones for the system that are used by the system controller (105) and is usually determined at the time the selective messaging unit is activated or when service is originally subscribed to. The memory contains a list of coverage zones (zones 1A, 1B, 1C, . . . , 2A, 2B, . . . ) (303,304,305, 306, 307, . . . ) the "A" chosen to reflect one coverage pattern and the "B" chosen to reflect a different coverage pattern. The memory, also contains, transmitters that are associated with each zone in a transmitter field (308), priorities in a priority field (309), and messaging units registered with each zone in an MU field (310). It is understood that a database indexed on the messaging unit address or identifier may be more desirable and may be used. In addition to the list of coverage zones the memory may include the operating system or software (312), other databases (314), and other functions (316).

Figure 4:
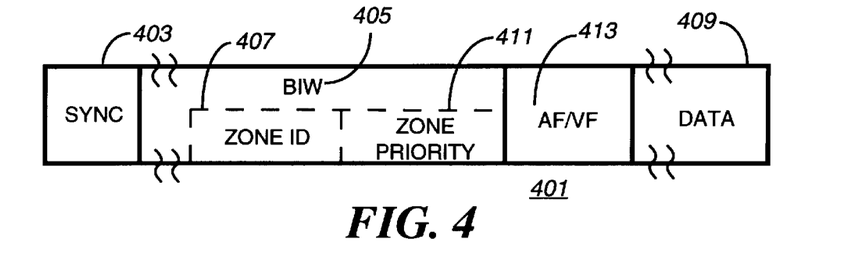
FIG. 4 is a exemplary protocol diagram.

When the system controller (105) sends messages to the selective messaging unit, the message includes information depicted in the exemplary protocol diagram (401) shown in FIG. 4. This diagram represents a portion of a packet that is 1.875 seconds long. In the preferred ReFlex™ protocol by Motorola 128 of the packets make up a 4 minute frame. The packet begins with a synchronization or sync (403) that provides for or facilitates synchronizing the incoming signal and the selective messaging unit and is well known. The data (409) portion of the message typically includes information intended to be conveyed to the user of a particular selective messaging unit that has been identified in the address/vector field (407).

This field will have an address that corresponds to a selective messaging unit and a corresponding vector that points to a location in the data or message field (409) for the message. The vector field will also indicate a subsequent inbound slot for a response from the messaging unit and may be used to specify, explicitly or implicitly inbound ALOHA slots for volitionally generated messages such as registration messages. Since messaging units are not collocated with the transmitters the interference patterns or areas between simultaneously operating messaging units will not be identical to the interference areas generated by the adjacent coverage zones. Therefore it is contemplated that providing an explicit indication of an ALOHA slot pattern available in each coverage zone will lower inbound interference and increase inbound ALOHA capacity. the system controller would avoid assigning the same inbound pattern to adjacent coverage zones but could reassign the pattern at distant coverage zones. This approach is expected to work best when most of the base receivers are co-located with the transmitters.

The Block Information Words or BIW (405) is used by the system controller (105) to inform all selective messaging units that are receiving the BIW of various system configuration parameters. Included in the BIW is a zone ID (407) that represents or corresponds to the coverage zone or other coverage entity, that the selective messaging unit is presently receiving. The BIW may also includes a zone priority (411) that corresponds to the coverage zone or zone ID (407) and is determined by the system controller (105).

This priority (411) allows the system controller (105) to statically or dynamically coordinate or initiate the selection of a coverage zone by a messaging unit. Once selected, such as by registration, this coverage zone is utilized by the controller to transmit or deliver messages to the selective messaging unit. The priority for a coverage zone is determined by the controller and will be based on one or more operational parameters, such as loading on various zones or operator preferences such as desired service levels or other coverage zone availability criteria as further explained.

Figure 2:
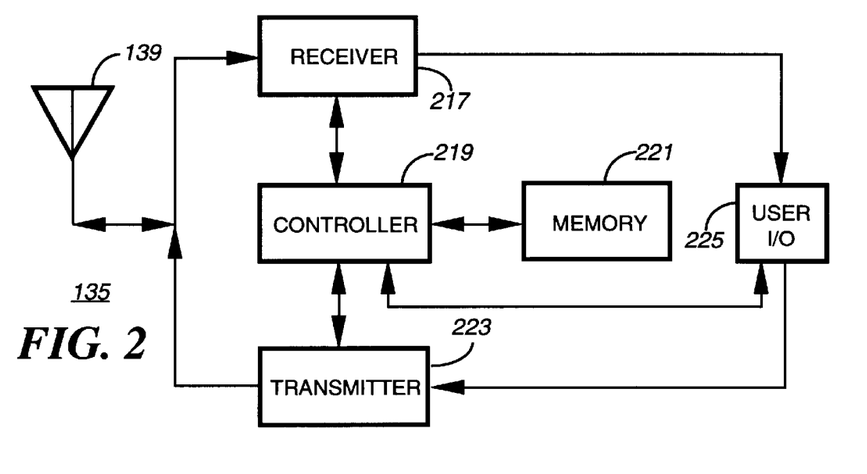
FIG. 2 is a block diagram of a selective messaging unit suitable for use in the FIG. 1 messaging system.

Continuing the present disclosure the reader is referred to the FIG. 2 block diagram of a selective messaging unit, such as unit (135), for the following discussion. Selective messaging units are available from Motorola and other suppliers and are commonly known as pagers. The ordinary pager may need to be modified in accordance with the inventive principles concerning priority disclosed herein and this modification would normally be a change in the operating system readily implemented by one skilled in the art in view of the principles herein. FIG. 2 depicts a selective messaging unit arranged and constructed for coordinating the selection of a coverage zone. The unit includes an antenna (139), coupled to a receiver (217) and a transmitter (223). The antenna (139) operates to absorb radio signals and couple them to the receiver (217), and, in the preferred two-way selective messaging unit, to radiate radio signals coupled to the antenna from the transmitter (223). The user I/O (325) is coupled to the receiver and the transmitter and a controller (219) and represents the medium, such as displays and push buttons, by which the selective messaging unit and the user communicate, in appropriate formats, messages and often, in the case of a preferred two-way messaging unit, responses.

The receiver includes generally known elements such as filters, amplifiers, mixers, frequency generation units or synthesizers, demodulators, decoders, and the like and is coupled to and under the control of the controller (219). The controller, for example, programs the synthesizer thus tuning the receiver to and allowing it to operate to monitor a channel for a coverage zone and receive various messages on that zone. Once a message is decoded or partly decoded the receiver together with the controller can check the message to see if the BIW (411) is of interest as well as, for example check the address field for correspondence with the address of the selective messaging unit. If a BIW, the various system configuration commands, or information may be appropriately used, the channel or zone cross referenced with a registered coverage zone in memory (221), and the priority (411), when available, updated in the list if appropriate. Upon activation the selective messaging unit is provided with an operating channel, for example channel (223) that usually has a higher status than other channels in the list. This higher status channel is the outbound and, preferably, inbound frequency or channel and may occupy the a "top" location in memory (221). Often some other operating channels, such as large coverage areas or region wide channels, would have different and usually lower status levels.

The selective messaging unit is arranged to select or facilitate selection of a coverage zone. To do so the receiver (217) monitors a channel stored or the channel list stored in the memory (221) of the selective messaging unit. In doing so the unit will receive one or more BIWs including zone Ids and associated priorities if available that identify one or more coverage zones. The controller (219), coupled to the receiver (217), is arranged to select a coverage zone from the detected zone IDs. In one embodiment the first zone ID represents the selected coverage zone. In another approach the messaging unit will compare the received zone priorities and select based on these comparisons the higher or better priority zone. Once the selective messaging unit has determined the most appropriate coverage zone, the transmitter (323) which is coupled to the controller (319) in the preferred two-way selective messaging unit will be used to register with the selective messaging system on that coverage zone according to generally known procedures, including formulating and transmitting a registration message on an inbound channel that identifies the selective messaging unit and the zone ID of the desired or selected coverage zone.

For a more detailed description of the operation of the selective messaging system controller or system controller (105) the following discussion is provided. The selective messaging system controller is arranged to schedule messages and control transmitters in a messaging system having a service area so as to enhance a reuse factor. This is accomplished by the network port (102) accepting message requests from message originators and the processor (131) forming a first, second, etc. plurality of messages based on these message requests where the messages are each associated with a zone ID and the zone ID may include a priority.

The processor (131) is arranged for scheduling the first plurality of messages for concurrent and independent transmission within a plurality of first coverage zones, such as coverage pattern (503), during a first time period, such as a packet time period, each message scheduled for, preferably simulcast, transmission within a unique first coverage zone, such as coverage zone (511), where the plurality of first coverage zones create an interference area, such as interference area (525).; The processor then schedule the second plurality of messages for concurrent transmission within a plurality of second coverage zones during a second time period. Each message is scheduled for transmission within a unique second coverage zone and the plurality of the second coverage zones provide coverage for a portion of the interference areas created by other coverage patterns.

Generally this process of scheduling continues so long as message requests are available and will include scheduling additional pluralities of messages for additional pluralities of coverage zones, where the additional pluralities of coverage zones collectively provide coverage, substantially, throughout the service area for the system. Consecutive groups of messages may be scheduled for the same coverage pattern or same set of coverage zones. This will depend on the temporal distribution of message requests and the location or registered location of messaging units. The selective messaging system controller specifically processor defines each unique first coverage zone by assigning a first set of the transmitters and each unique second coverage zone by assigning a second set of the transmitters. The second set include one or more transmitters from one of the first set of the transmitters. It is further preferred that the messaging system or messaging system controller include an occasional rescue coverage area or plan wherein the system reverts to normal simulcast operation for a short while. This is expected to allow any messaging units that have become lost or have managed to find an area of marginal or no coverage to reacquire or relock to the messaging system.

In any event the transmitter port (106) in conjunction with the processor operates to send the first, second, etc. pluralities of messages to the transmitters and controls these transmitters to effect the concurrent transmission of the first plurality of messages amongst the first coverage zones and the second plurality amongst the second coverage zones. The receiver port (110) receives various inbound messages such as acknowledgments or registration messages including one coverage zone ID that identifies a coverage zone for a selective messaging unit. When a registration message is received the system controller or processor must update the contents of memory (133) to reflect the chosen coverage zone for the messaging unit.

Figure 7:
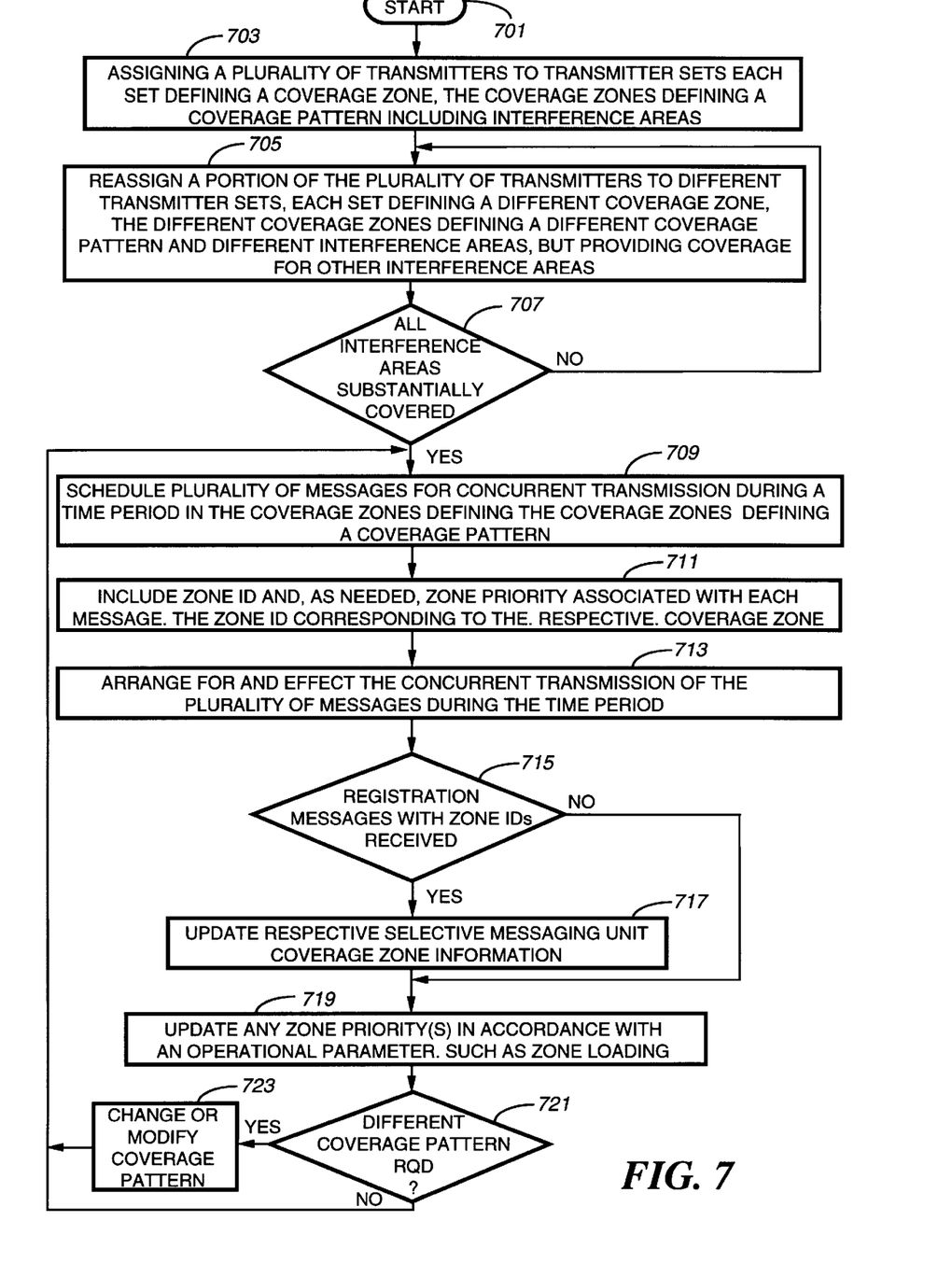
FIG. 7 is a flow chart of a preferred method embodiment in accordance with the present invention.

Referring to the FIG. 7 flow chart a method, set in a selective messaging system, of providing coverage with an improved reuse factor is depicted. Much of the method is preferably implemented in a processor executing software readily developed by one of ordinary skill in view of the principles disclose herein. The method starts at (701) after which step (703 assigns a plurality of transmitters to transmitter sets (523) each set defining a coverage zone (511) and the coverage zones collectively defining a coverage pattern (503) and creating interference areas (525, ) These coverage zones are suitable for providing independent simulcast coverage within this set of coverage zones during a time period. Step (704) reassigns all or a portion of the plurality of transmitters to different transmitters sets such as set (531) each of these sets defining a different coverage zone (515) and collectively defining a different coverage pattern (505) and different interference areas but providing coverage for a portion of the interference area (525). These coverage zones are also suitable for providing independent simulcast coverage within a this set of coverage zones during a second time period when the different coverage area (505) is active. Step (707) tests whether all interference areas are substantially covered or provided with coverage and if not step (705) is repeated so as to define additional sets of coverage zones defining additional coverage patterns until the step (707) test is positive.

The balance of the FIG. 7 flow chart depicts a method of scheduling messages in a selective messaging system having transmitters within a service area where the method operates to improve reuse factors in the system. Step (709) schedules a plurality of messages for concurrent transmission, during a time period, such as a packet time, within the coverage zones that define a coverage pattern. Each message is scheduled for transmission within a unique coverage zone depending on the registration of the messages target unit and as noted above the coverage zones create an interference area. Step (711) includes a zone ID to be associated with each message and as or if needed a zone priority, where the zone ID corresponds to the respective coverage zone. Step (713) arranges for and effects the concurrent transmission among the coverage zones and, preferably, a simulcast transmission within the coverage zone, of the plurality of messages during the time period.

Step (715) tests to determine whether any registration messages including associated zone IDs that identify a coverage zone have been received from a selective messaging unit and if so step (717) updates the respective selective messaging units coverage zone information at the system controller. Next step (719) updates any zone priority information in accordance with an operational parameter, such as zone loading or operator preference. Step (721) checks to see whether a different coverage pattern is required and if so step (723) changes or modifies the pattern. If not or after step (723) the process repeats starting at step (709) and schedules a second plurality of messages for concurrent transmission within a plurality of second coverage zones during a second time period, each message scheduled for transmission within a unique second coverage zone, the plurality of the second coverage zones providing coverage for a portion of the interference areas from the previous coverage patterns. These steps of the process are repeated for additional coverage areas so as to provide coverage throughout the service area.

It will be appreciated by those of ordinary skill in the art that the apparatus and methods disclosed provide various inventive techniques for assigning transmitters to provide coverage and scheduling messages within a messaging system so as to improve or enhance a reuse factor. The apparatus and methods discussed have improved the reuse factor with no or nominal impact of system coverage over known techniques. This has been done without compromising the messaging system service and without otherwise burdening processing resources in either the system controller or the selective messaging unit. These inventive structures and methods may be readily and advantageously employed in a selective messaging system or other communications devices or system to improve a reuse factor for the system. Hence, the present invention, in furtherance of satisfying a long-felt need of messaging systems, readily facilitates, additional reuse operation and may be further used to facilitate load management. The methods and apparatus disclosed are readily effected and practical to implement from a physical or economic perspective.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A selective messaging system controller arranged to schedule messages and control transmitters in a messaging system having a service area so as to enhance a reuse factor, the selective messaging controller comprising in combination:

a network port for accepting message requests from message originators;

a processor, coupled to said network port, said processor arranged and operating for;

forming a first and a second plurality of messages;
scheduling said first plurality of messages for concurrent transmission within a multiplicity of first coverage zones during a first time period, each message scheduled for transmission within a unique first coverage zone, said multiplicity of said first coverage zones creating a first multiplicity of interference areas; and then
scheduling said second plurality of messages for concurrent transmission within a multiplicity of second coverage zones during a second time period, each message scheduled for transmission within a unique second coverage zone, said multiplicity of said second coverage zones creating a second multiplicity of interference areas and providing coverage for a portion of said first multiplicity of interference area; and
said processor repeating said forming and said scheduling operations until coverage has been provided throughout said service area; and
a transmitter port, coupled to said processor, for sending said first and said second plurality of messages to the transmitters and controlling said transmitters to effect said concurrent transmission of said first and said second plurality of messages.

2. The selective messaging system controller of claim 1 wherein said processor includes a zone ID associated with each coverage zone.

3. The selective messaging system controller of claim 2 wherein said processor further includes a priority signal with said zone ID.

4. The selective messaging system controller of claim 1 further including a receiver port for receiving a registration message including one coverage zone ID that identifies a coverage zone for a selective messaging unit.

5. The selective messaging system controller of claim 1 wherein said processor defines each unique first coverage zone by assigning a first set of the transmitters and each unique second coverage zone by assigning a second set of the transmitters, said second set including one or more transmitters from one of said first set of the transmitters.

6. The selective messaging controller of claim 1 wherein said processor controls said transmitters to effect simulcast transmission within each coverage zone.

7. In a selective messaging system arranged to have transmitters within a service area a method of scheduling messages with improved reuse factors, the method including the steps of:
scheduling a first plurality of messages for concurrent transmission within a multiplicity of first coverage zones during a first time period, each message scheduled for transmission within a unique first coverage zone, said multiplicity of said first coverage zones creating a first multiplicity of interference areas; and then
scheduling a second plurality of messages for concurrent transmission within a multiplicity of second coverage zones during a second time period, each message scheduled for transmission within a unique second coverage zone, said multiplicity of said second coverage zones creating a second multiplicity of interference areas and providing coverage for a portion of said first multiplicity of interference area; and
wherein said steps of scheduling is repeated for additional pluralities of messages for additional multiplicities of coverage zones, said additional multiplicities of said coverage zones collectively providing coverage substantially throughout the service area.

8. The method of claim 7 further having a step of including a zone ID associated with each coverage zone.

9. The method of claim 8 wherein said step of including also includes a priority signal with said zone ID.

10. The method of claim 7 further including a step of receiving a registration message including one coverage zone ID that identifies a coverage zone for a selective messaging unit.

11. The method of claim 7 further including a step of defining each unique first coverage zone by assigning a first set of the transmitters and each unique second coverage zone by assigning a second set of the transmitters, said second set including one transmitter from one of said first set of the transmitters.

12. The method of claim 7 further including a step of arranging for said concurrent transmission of said first plurality of messages by said transmitters and effecting a simulcast transmission within each coverage zone.

13. In a selective messaging system a method of providing coverage with an improved reuse factor, the method including the steps of:
assigning a plurality of transmitters to provide independent simulcast coverage within a first set of coverage zones during a first time period, said first set of coverage zones defining a first coverage pattern, said first set of coverage zones creating a first multiplicity of interference areas;
reassigning a portion of said plurality of transmitters to provide independent simulcast coverage within a second set of coverage zones during a second time period, said second set of coverage zones defining a second coverage pattern and creating a second multiplicity of interference areas, said second set of coverage zones providing coverage for a portion of said first multiplicity of interference areas during said second time period and
reassigning said plurality of transmitters to provide independent simulcast coverage within additional sets of coverage zones defining additional coverage patterns until all interference areas are provided with coverage.

* * * * *